United States Patent
Goykhman et al.

(10) Patent No.: US 12,494,699 B2
(45) Date of Patent: Dec. 9, 2025

(54) INTEGRATED ELECTRIC MOTOR AND THERMAL MANAGEMENT SYSTEM

(71) Applicant: EATON INTELLIGENT POWER LIMITED, Dublin (IE)

(72) Inventors: Mikhail Goykhman, Reseda, CA (US); Galen Chui, Ladera Ranch, CA (US); Armen Baronian, Toronto (CA)

(73) Assignee: Eaton Intelligent Power Limited, Dublin (IE)

( * ) Notice: Subject to any disclaimer, the term of this patent is extended or adjusted under 35 U.S.C. 154(b) by 533 days.

(21) Appl. No.: 17/800,685

(22) PCT Filed: Feb. 19, 2021

(86) PCT No.: PCT/EP2021/025063
§ 371 (c)(1),
(2) Date: Aug. 18, 2022

(87) PCT Pub. No.: WO2021/164942
PCT Pub. Date: Aug. 26, 2021

(65) Prior Publication Data
US 2023/0074332 A1    Mar. 9, 2023

Related U.S. Application Data

(60) Provisional application No. 62/979,849, filed on Feb. 21, 2020.

(51) Int. Cl.
*H02K 9/22* (2006.01)
*B64D 29/00* (2006.01)
(Continued)

(52) U.S. Cl.
CPC ............ *H02K 9/227* (2021.01); *B64D 29/00* (2013.01); *B64D 33/08* (2013.01); *B64D 35/08* (2013.01);
(Continued)

(58) Field of Classification Search
CPC ........ B64D 27/24; B64D 29/00; B64D 33/08; B64D 35/08; H02K 5/203; H02K 7/116; H02K 9/193; H02K 21/24
(Continued)

(56) References Cited

U.S. PATENT DOCUMENTS 6,329,731 B1 * 12/2001 Arbanas ................ F16H 57/043
310/58
11,787,551 B1 * 10/2023 Graves ................... B64D 33/10
244/56
(Continued)

FOREIGN PATENT DOCUMENTS

| CN | 107147260 A | 9/2017 |
|---|---|---|
| WO | 2021/089188 A1 | 5/2021 |
| WO | 2021/089189 A1 | 5/2021 |
| WO | 2021/115632 A1 | 6/2021 |
| WO | 2021/164944 A1 | 8/2021 |

OTHER PUBLICATIONS

International Search Report and Written Opinion of the International Searching Authority for International Patent Application No. PCT/EP2021/025063 mailed May 28, 2021, 10 pages.

*Primary Examiner* — Rashad H Johnson
(74) *Attorney, Agent, or Firm* — Merchant & Gould P.C.

(57) ABSTRACT

A compact electric motor assembly unit includes an electric motor and an integrated thermal management system. A heat exchanger may be mounted directly to the electric motor and/or form part of the motor housing. A coolant pump may be mounted directly to the electric motor. The coolant pump may be connected either to a drive shaft of the electric motor or to a gear train disposed inside of the electric motor. In certain cases, the coolant pathways for the thermal management system are all located internal of the electric motor assembly unit.

21 Claims, 18 Drawing Sheets

(51) Int. Cl.
*B64D 33/08* (2006.01)
*B64D 35/08* (2006.01)
*H02K 5/20* (2006.01)
*H02K 7/116* (2006.01)
*H02K 9/193* (2006.01)
*H02K 21/24* (2006.01)

(52) U.S. Cl.
CPC .............. *H02K 5/203* (2021.01); *H02K 7/116* (2013.01); *H02K 9/193* (2013.01); *H02K 21/24* (2013.01)

(58) Field of Classification Search
USPC .......................................................... 310/54
See application file for complete search history.

(56) References Cited

U.S. PATENT DOCUMENTS

| | | | |
|---|---|---|---|
| 12,214,894 B1* | 2/2025 | Graves | B64D 27/33 |
| 12,240,617 B2* | 3/2025 | Tepe | B64D 35/02 |
| 2017/0163125 A1* | 6/2017 | Granat | H02K 9/18 |
| 2017/0237314 A1* | 8/2017 | Moore | F16H 1/28 |
| | | | 475/149 |
| 2017/0310189 A1* | 10/2017 | Hanumalagutti | H02K 5/203 |
| 2019/0329859 A1* | 10/2019 | Bevirt | B64C 23/005 |
| 2024/0253791 A1* | 8/2024 | Graves | F16H 57/08 |
| 2024/0253797 A1* | 8/2024 | Tepe | H02K 11/33 |
| 2024/0270394 A1* | 8/2024 | Graves | H02K 7/08 |

* cited by examiner

INTEGRATED ELECTRIC MOTOR AND THERMAL MANAGEMENT SYSTEM

CROSS-REFERENCE TO RELATED APPLICATION

This application is a National Stage Application of PCT/EP2021/025063, filed on Feb. 19, 2021, which claims the benefit of U.S. Patent Application Ser. No. 62/979,849, filed on Feb. 21, 2020, the disclosures of which are incorporated herein by reference in their entireties. To the extent appropriate, a claim of priority is made to each of the above-disclosed applications.

BACKGROUND

More-electric aircraft and all-electric aircraft are increasingly becoming more relevant in the aerospace industry. Electrical drive systems (EDS) including an electric motor and an electric drive are gaining interest in aerospace applications due to growing demands for more/all-electric aircrafts. To enhance the design of these new air vehicles, power density of electric machines is becoming an important factor due to the weight/volume constraints associated with air travel. Achieving higher current to weight and current to volume target is a real challenge. One of the hurdles to deal with in a high power density machine is heat extraction.

FIG. 1 shows an example thermal management arrangement for a prior system 50 including an electric motor 52 coupled in series to a separate gear train 54 and a propeller 56 or other load source using a motor shaft. An electric drive 58 controls the speed and/or torque applied by the electric motor 52 to the motor shaft based on a voltage and/or current input of the electric drive 58. The electric motor 52 is thermally managed using a separate coolant pump 60 and a separate heat exchanger 62. The coolant pump 60 drives coolant from the coolant pump 60, to the electric drive 58 to absorb heat from the electric drive 58, to the electric motor 52 to absorb heat from the electric motor 52, and to a heat exchanger 62 to dissipate the absorbed heat.

The coolant driven by the pump 60 passes through external piping that connects the various components. In some examples, the coolant proceeds along a cyclic piping pathway 64 from the pump 60, to the electric drive 58, to the electric motor 52, and then to the heat exchanger 62. In other examples, the coolant proceeds along separate piping pathways between the pump 60 and the various components 58, 52, 62. The external piping needs to be fitted to each of the components for connection to internal coolant pathways (e.g., channels) within the component. Further, sufficient coolant must be provided to span the distance between the components as well as to circulate within the components.

Improvements are desired.

SUMMARY

Some aspects of the disclosure are directed to a compact electric motor assembly unit including both an electric motor and an integrated thermal management system for the electric motor.

In some implementations, the integrated thermal management system includes a heat exchanger mounted directly to the electric motor. The electric motor structurally supports the heat exchanger. In certain examples, the heat exchanger is disposed between the first and second axial ends of the electric motor and is radially aligned with the electric motor relative to a drive shaft of the electric motor. In some examples, the heat exchanger encircles the electric motor and extends radially outwardly from the electric motor. In other examples, the heat exchanger extends outwardly from a circumferential segment of the electric motor.

In certain implementations, the compact electric motor assembly unit is disposed in line with a propeller as part of an aircraft propulsion system so that at least some airflow from the propeller flows over the heat exchanger.

In other implementations, the integrated thermal management system includes a coolant pump mounted to the electric motor so as to be structurally supported by the electric motor. The coolant pump is fluidly coupled to a coolant pathway extending through the electric motor.

In certain implementations, the coolant pump also is fluidly coupled to a heat exchanger mounted directly to the electric motor.

In certain implementations, the coolant pump also is fluidly coupled to an epicyclic gear train mounted within the electric motor. In certain examples, the coolant pump is operationally coupled to a different gear stage of the epicyclic gear train than a drive shaft of the electric motor.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to an electric motor assembly unit 100 including an electric motor 110 having one or more integrated thermal management components. The electric motor assembly unit 100 extends along a longitudinal axis L between opposite first and second axial ends 102, 104. In the example shown, the electric motor assembly unit 100 has a generally circular cross-sectional area that varies in diameter along the longitudinal axis L. In other examples, however, the electric motor assembly unit 100 can have other cross-sectional shapes (e.g., rectangular, oblong, etc.). In some implementations, the electric motor 110 is an axial flux motor 20. In other implementations, the electric motor 110 is a radial flux motor.

Figure 1:
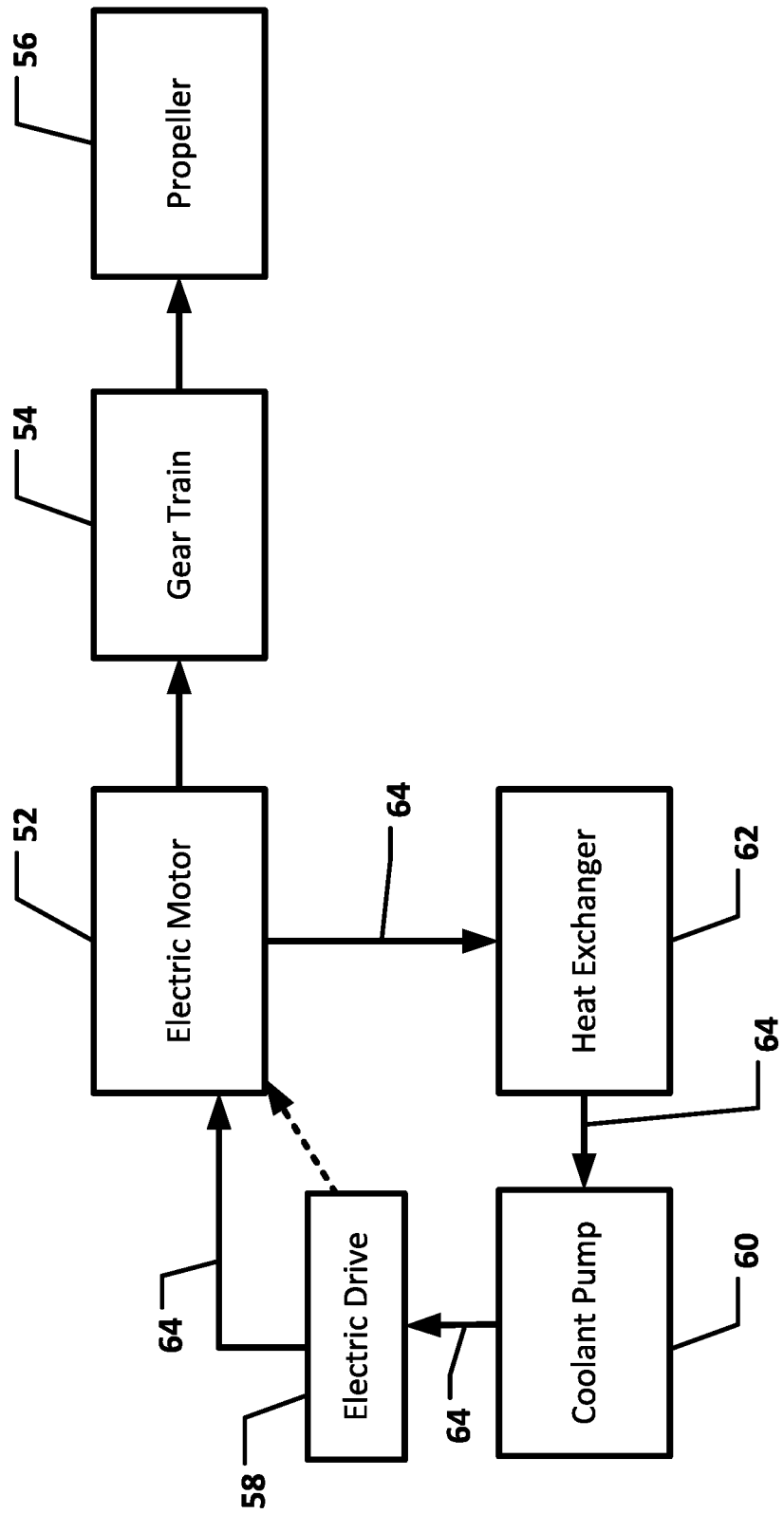
FIG. 1 is a schematic diagram of an example prior art system for providing thermal management to an electric motor.
Figure 2:
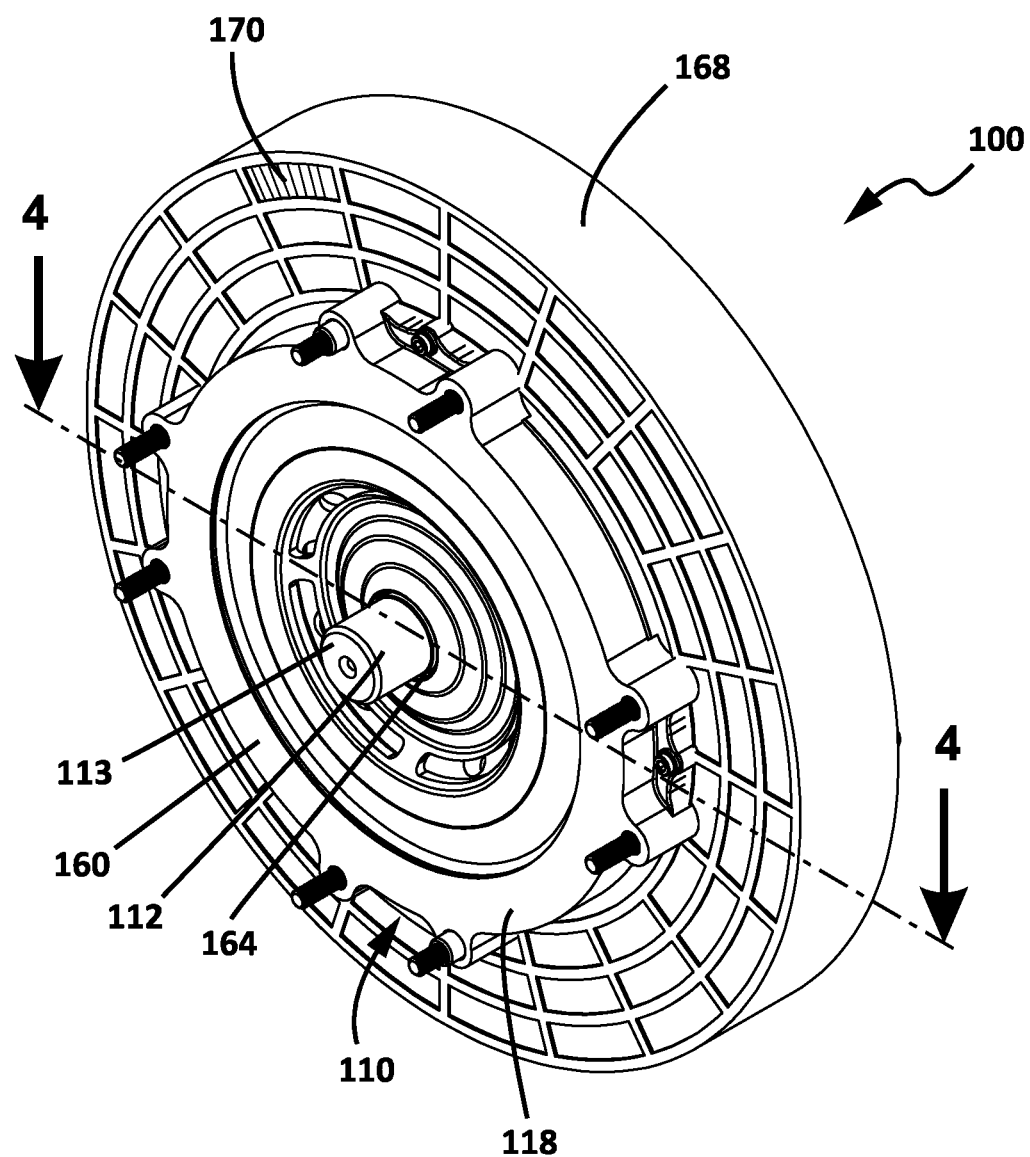
FIG. 2 is a perspective view of an example electric motor assembly unit including an electric motor and a heat exchanger configured in accordance with the principles of the present disclosure.
Figure 3:
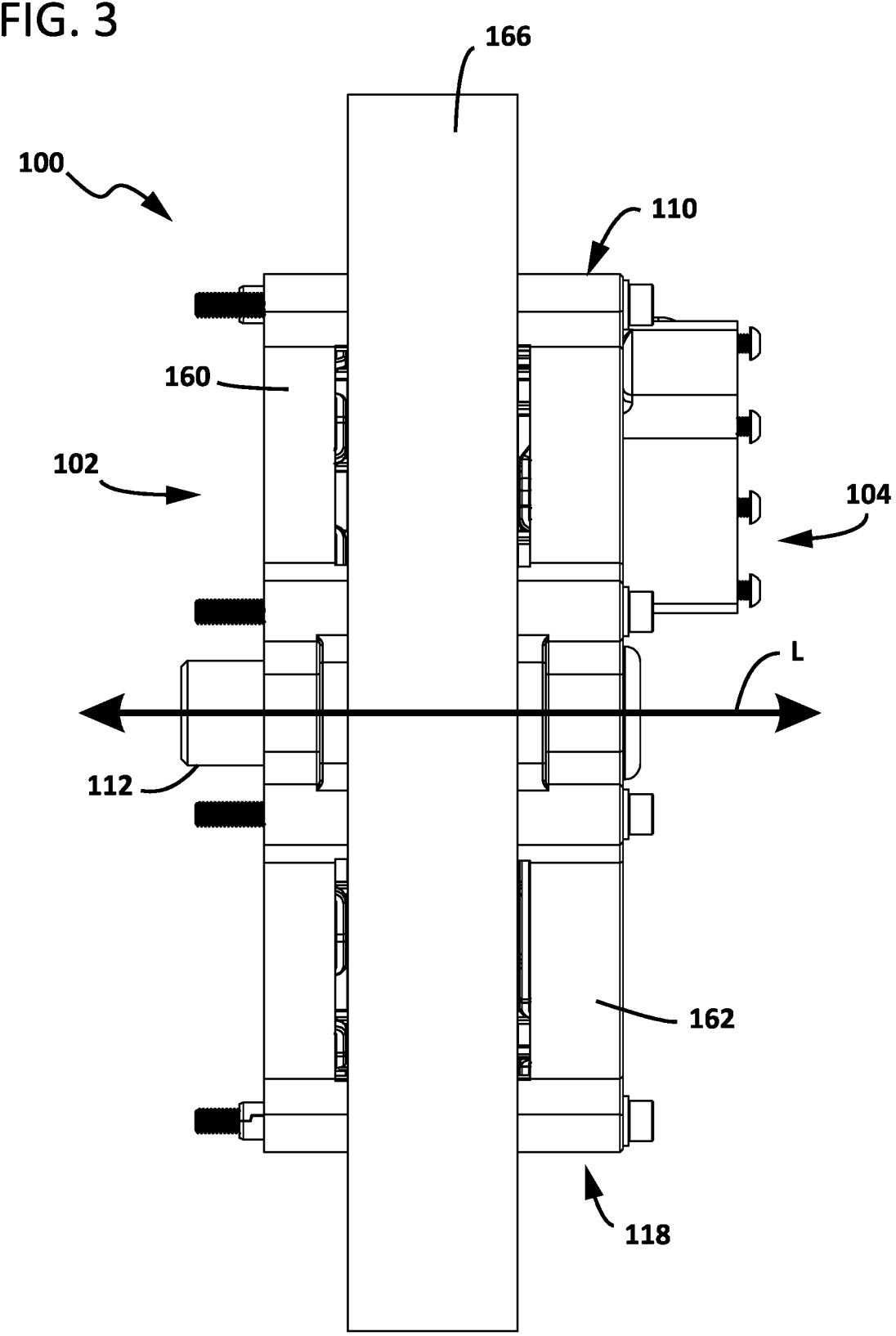
FIG. 3 is a side elevational view of the electric motor assembly unit of FIG. 2.
Figure 4:
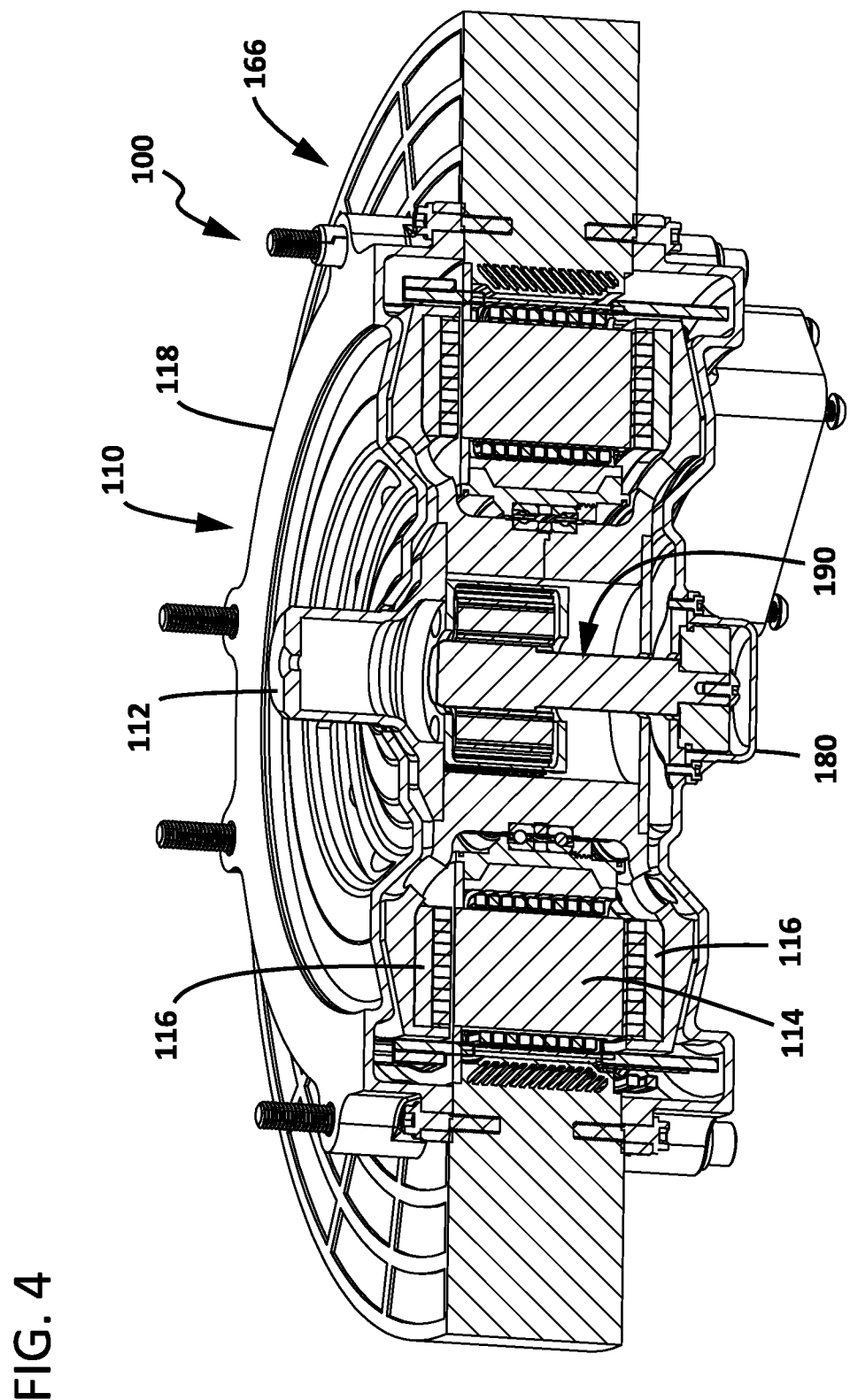
FIG. 4 is a perspective view of an example cross-section of the electrical motor assembly unit taken along the 4-4 line of FIG. 2.

As shown in FIGS. 2-4, the electric motor 110 includes a motor shaft 112, a stator assembly 114, and a rotor assembly 116. The motor shaft 112 extends along the longitudinal axis L of the electric motor assembly unit 100. The rotor assembly 116 is adapted to rotate about the longitudinal axis L relative to the stator assembly 114. The motor shaft 112 is operationally coupled to the rotor assembly 116 to also rotate about the longitudinal axis L while the rotor assembly 116 is rotating. In some implementations, the motor shaft 112 rotates in unison with the rotor assembly 116. In other implementations, the motor shaft 112 rotates at a different gear stage from the rotor assembly 116. In certain implementations, a motor housing 118 encloses the stator assembly 114 and the rotor assembly 116. An end portion 113 of the motor shaft 112 projects outwardly from the motor housing 118 along the axis of rotation L.

Figure 5:
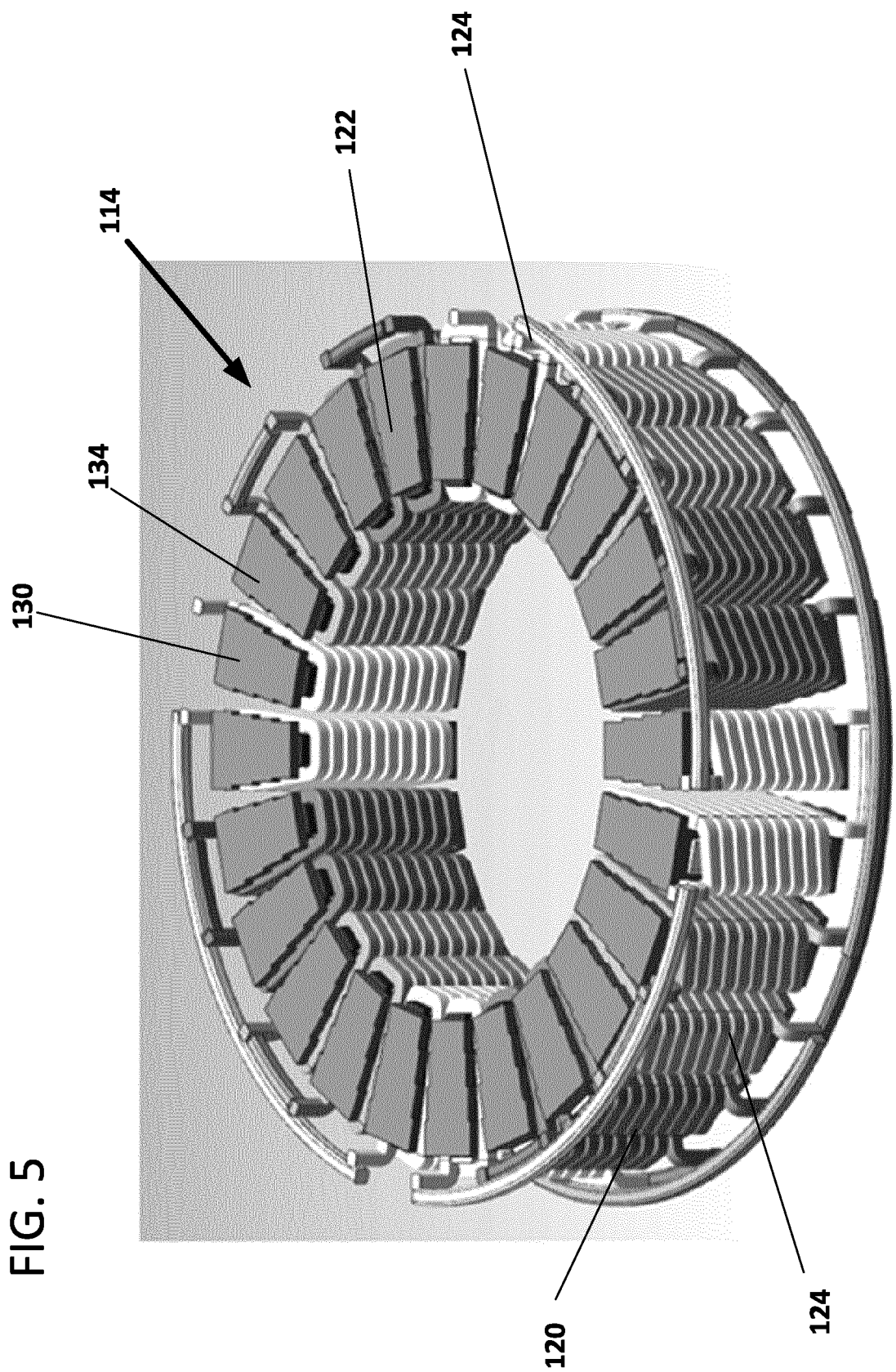
FIG. 5 is a perspective view of an example stator assembly suitable for use with the electric motor of FIG. 2.
Figure 6:
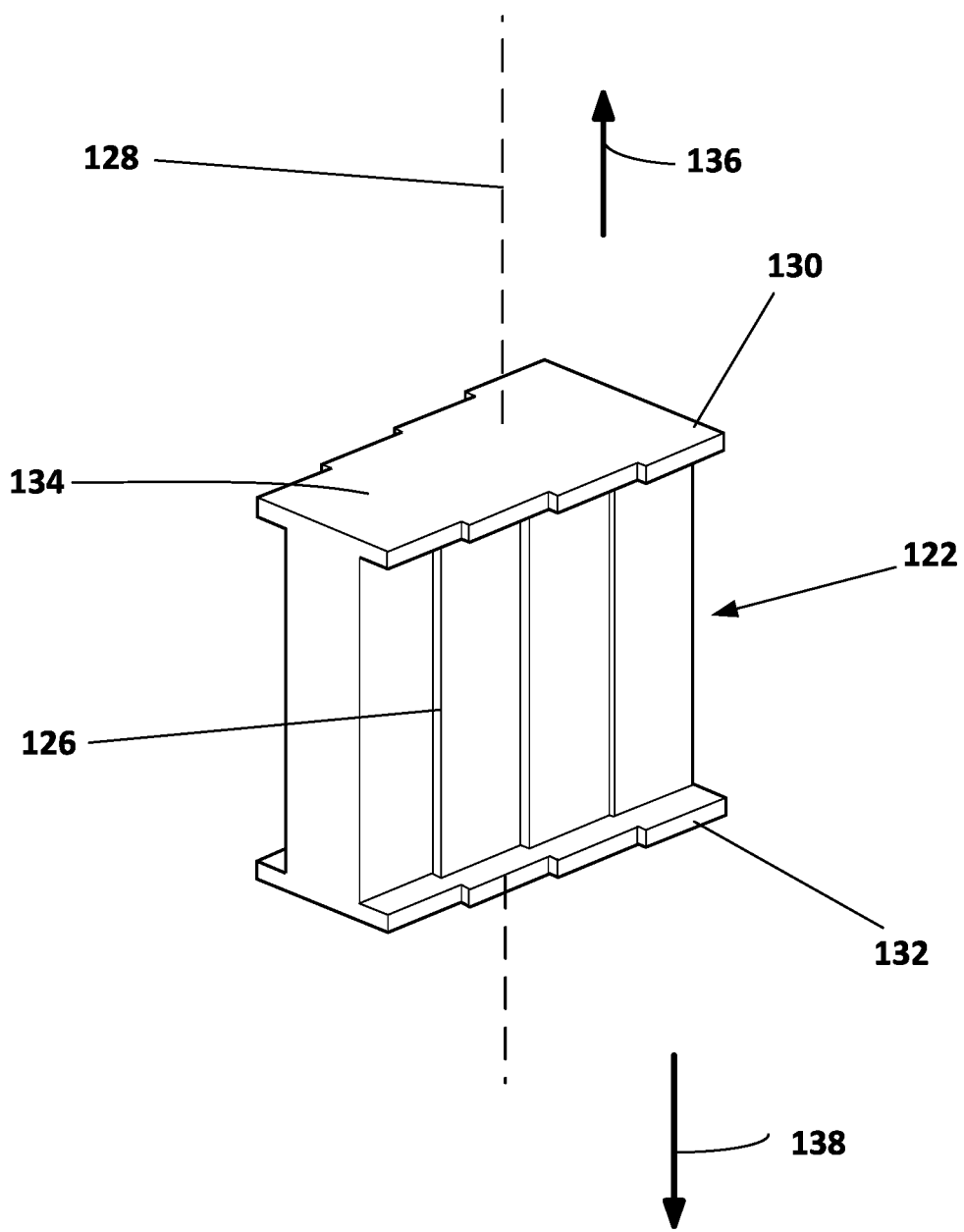
FIG. 6 is a perspective view of an example stator core suitable for use with the stator assembly of FIG. 5.
Figure 7:
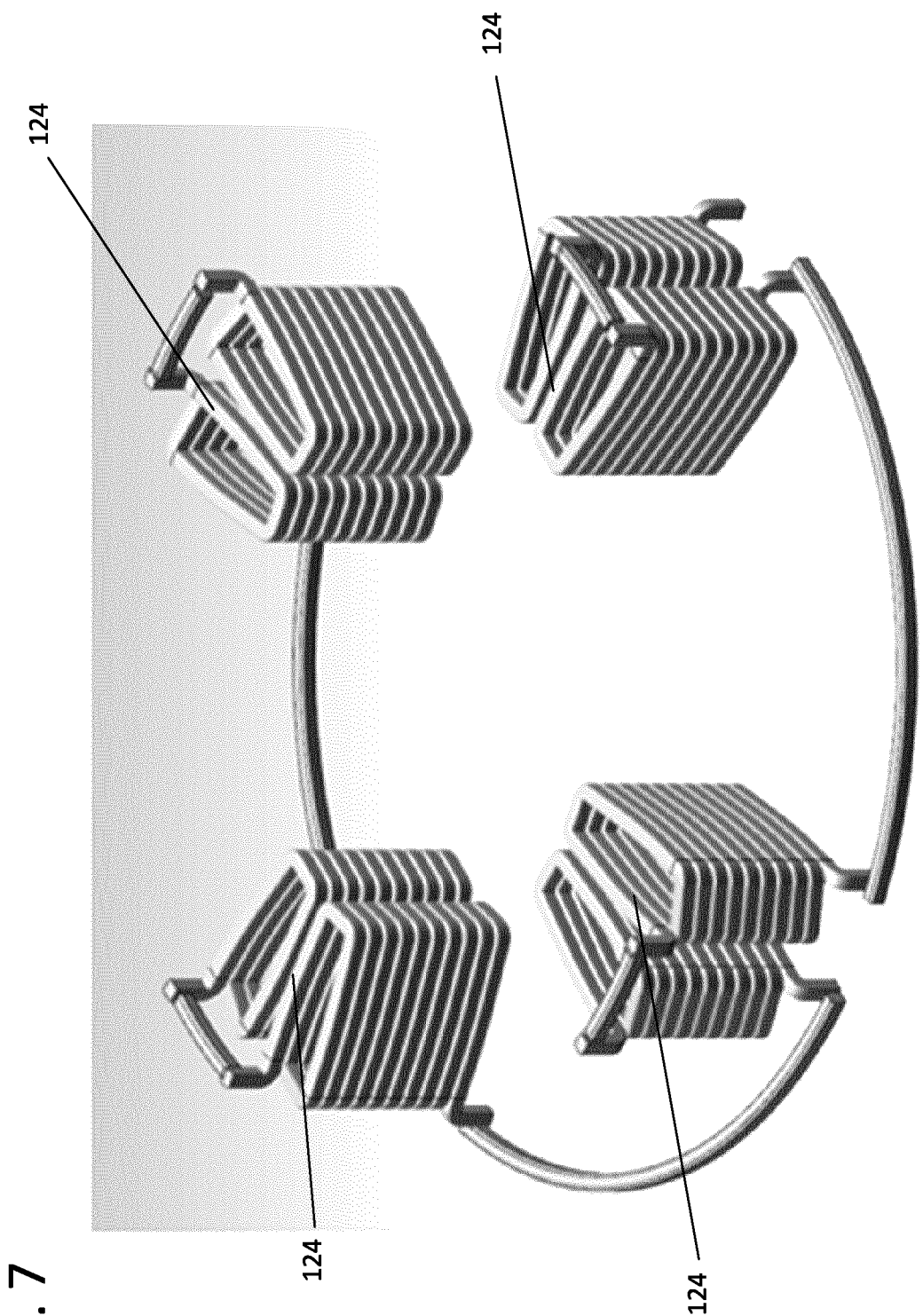
FIG. 7 is a perspective view of an example wire coiling suitable for use with the stator assembly of FIG. 5.

FIGS. 5-7 illustrate an example stator assembly 114 suitable for use with the electric motor 100 described herein. The stator assembly 114 includes multiple electromagnets 120 spaced circumferentially about the axis of rotation L. The electromagnets 120 each include a stator core 122 about which a wire coil 124 is wound (e.g., a copper winding as shown at FIG. 7). FIG. 6 shows a stator core 122. The stator cores 122 each include a core body 126 which extends along a core axis 128 between first and second opposite axial ends 130, 132 of the core body 126. The first axial ends 130 define first end faces 134 that face in a first axial direction 136 and the second axial ends 132 define second end faces that face in a second axial direction 138 opposite from the first axial direction 136. The wire coils 124 are wound about the core axes 128 and are located between the first and second axial ends 136, 138 of the core bodies 126. The first and second axial ends 130, 132 of each stator core 122 are adapted to define opposite magnetic poles of each corresponding electromagnet 120.

Figure 8:
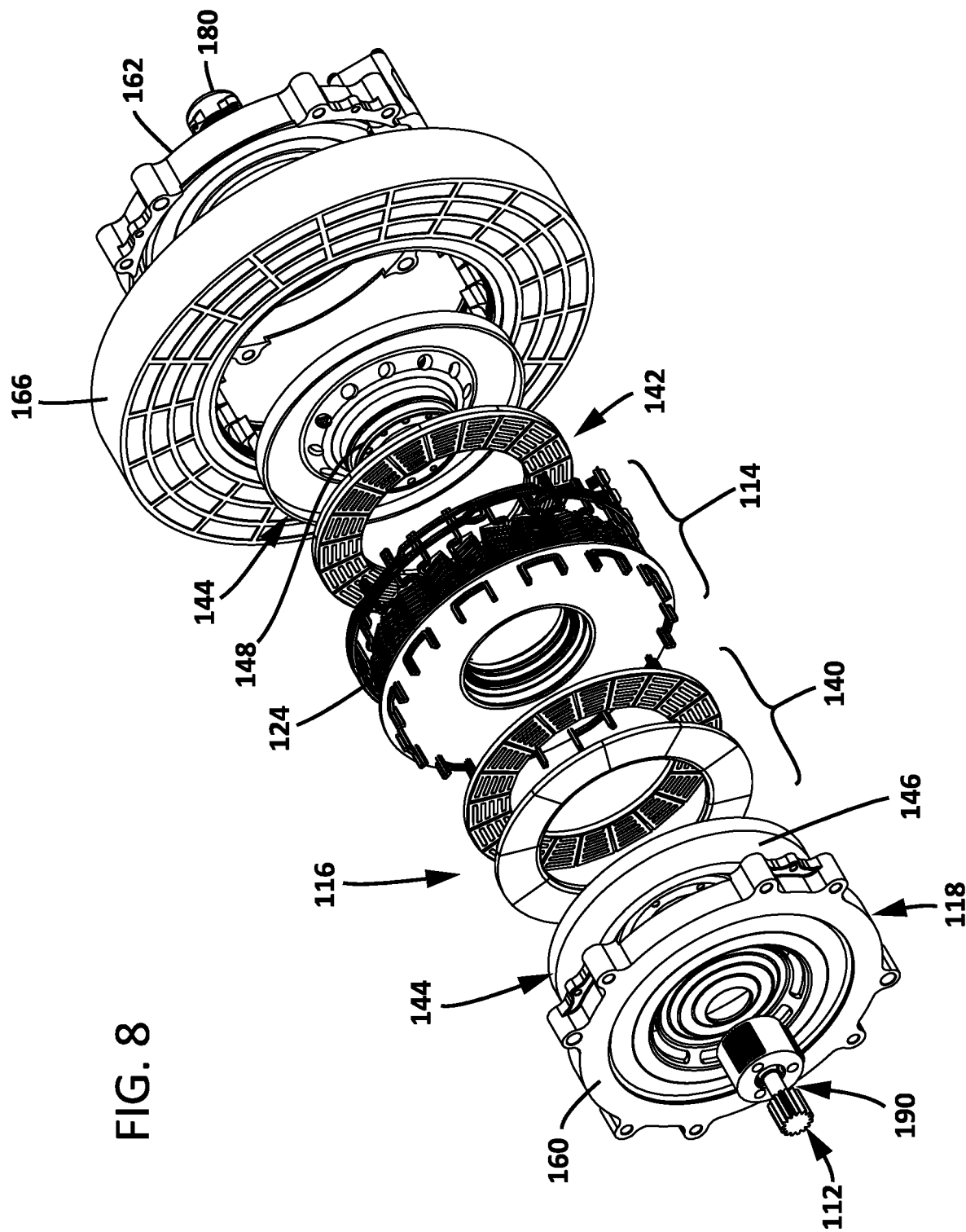
FIG. 8 is a perspective view of an example electric motor assembly unit that is substantially the same as the electric motor assembly unit of FIG. 2 except the motor shaft is defined by a gear train that fits within the electric motor.
Figure 9:
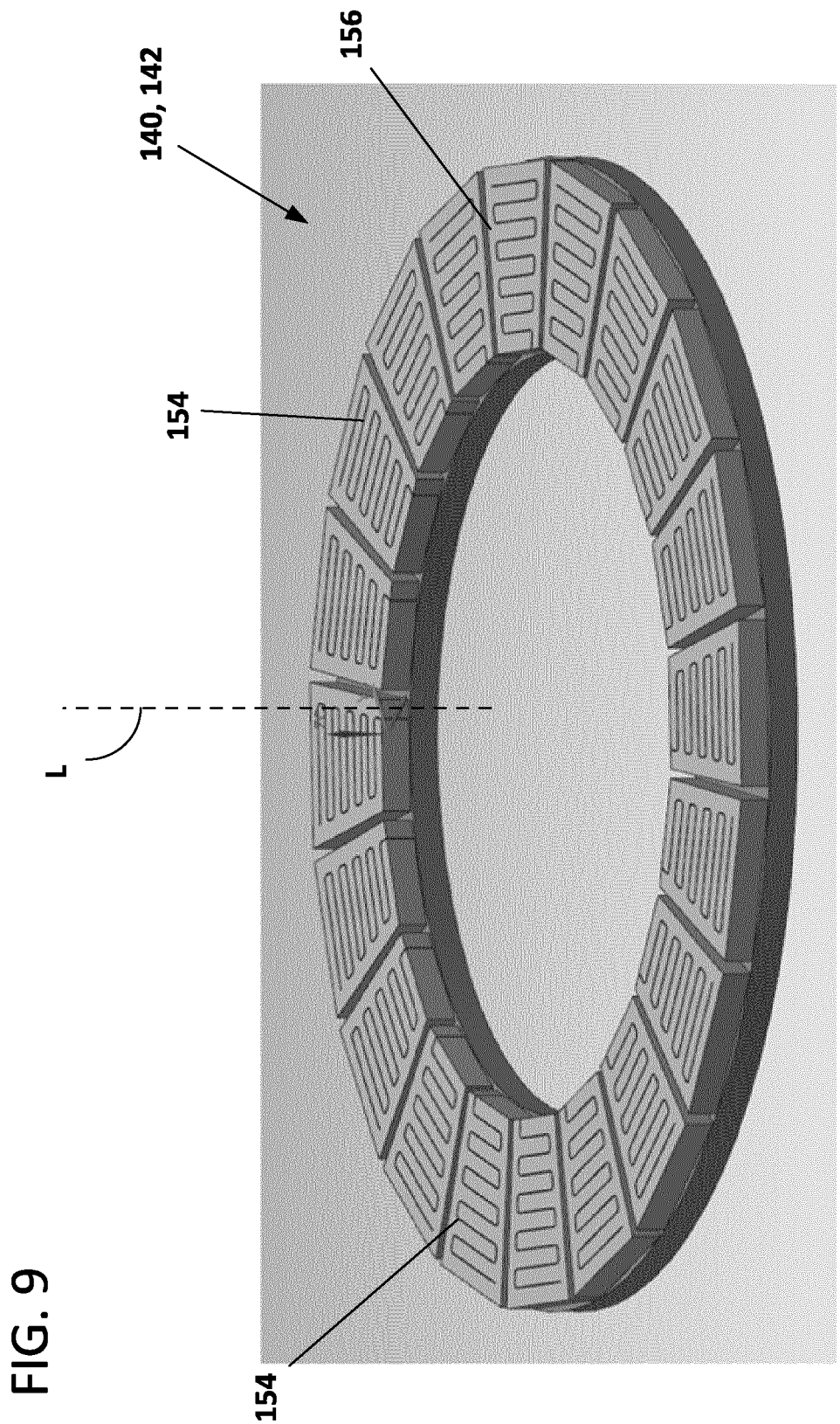
FIG. 9 is a perspective view of an example magnetic rotor suitable for use with the rotor assembly of the electric motor of FIG. 2.

An example rotor assembly 116 suitable for use with the electric motor 100 described herein is shown in FIGS. 8-9. The rotor assembly 116 includes a first magnetic rotor 140 and a second magnetic rotor 142 disposed at opposite axial ends of the stator assembly 114. The first and second magnetic rotors 140, 142 are adapted to rotate in unison with each other about the axis of rotation L. In certain implementations, the first and second magnetic rotors 140, 142 are identical to each other.

Each of the magnetic rotors 140, 142 is supported by a respective rotor carrier 144 including a rotor plate 146 (e.g., a rotor flange) that projects radially outwardly from a central hub portion 148. The central hub portions 148 of the first and second magnetic rotors 140, 142 are preferably fastened (e.g., bolted) together to define a hub of the rotor assembly 116. The hub can be mounted for rotation relative to the stator cores 122 by one or more rotational bearings 150. As depicted, the rotational bearings 150 can be mounted between the hub and a sleeve 152 secured at an inner diameter of the stator assembly 114. In one example, the electromagnets 120 can be secured about the sleeve 152 by an adhesive material such as a thermally conductive epoxy.

In some implementations, the motor shaft 112 is coupled to the rotor assembly 116. For example, the motor shaft 112 can include a flange 113 that is fastened (e.g., bolted) to the hub 148 of the rotor assembly 116. In such implementations, it will be appreciated that the motor shaft 112 and the rotor assembly 116 are adapted to rotate in unison with respect to one another about the axis of rotation L relative to the stator assembly 114. In other implementations, a gear train (e.g., an epicyclic gear train as will be described in more detail herein) operationally couples the motor shaft 112 to the hub 148 so that the motor shaft 112 rotates at a different speed and/or torque from the hub 148.

Figure 10:
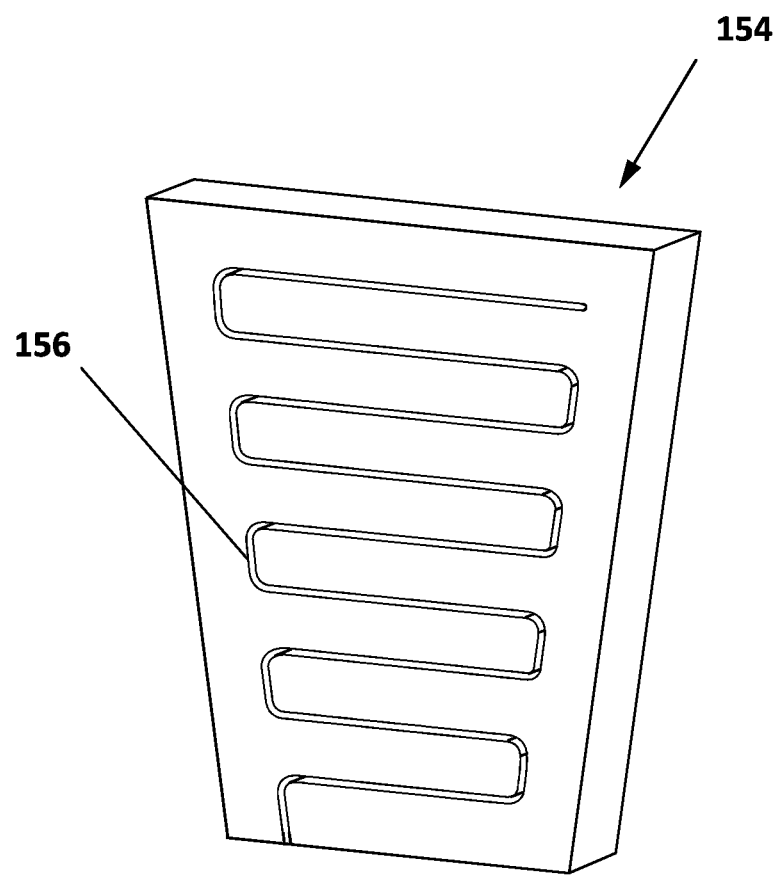
FIG. 10 is a perspective view of an example permanent magnet of the magnetic rotor of FIG. 9.

FIG. 9 illustrate an example implementation of a magnetic rotor suitable for use as the first magnetic rotor 140 and/or the second magnetic rotor 142. The magnetic rotor 140, 142 includes multiple permanent magnets 154 (e.g., see FIG. 10) carried by the rotor plate 148 of the respective carrier 144. The permanent magnets 154 are circumferentially spaced about the axis of rotation L. The permanent magnets 154 of the first magnetic rotor 140 have first permanent magnet end faces 156 positioned to oppose the first axial end faces 134 of the stator cores 122. The permanent magnet end faces 156 are spaced from the first axial end faces 134 of the stator cores 122 by a first air gap. The permanent magnets 154 of the second magnetic rotor 142 have second permanent magnet end faces positioned to oppose the second axial end faces of the stator cores 122. The second permanent magnet end faces are spaced from the second axial end faces of the stator cores 122 by a second air gap.

Referring back to FIGS. 2-4, the motor housing 118 encloses the stator and rotor assemblies 114, 116 to form an exterior of the motor assembly unit 100. The motor housing 118 includes first and second axial walls 160, 162 that cover the carriers 144 of the first and second magnetic rotors 140, 142, respectively. In certain examples, the first and second axial walls 160, 162 preferable have a metal (e.g., aluminum) construction. The first axial end wall 160 defines a central opening 164 through which the end portion 113 of the motor shaft 112 extends. The motor housing 118 also includes a circumferential wall that extends between the first and second axial walls 160, 162. In one example, the second axial end wall 162 can be unitarily connected with the circumferential wall, while the first axial end wall 160 can be configured as a removable axial end cover.

Figure 11:
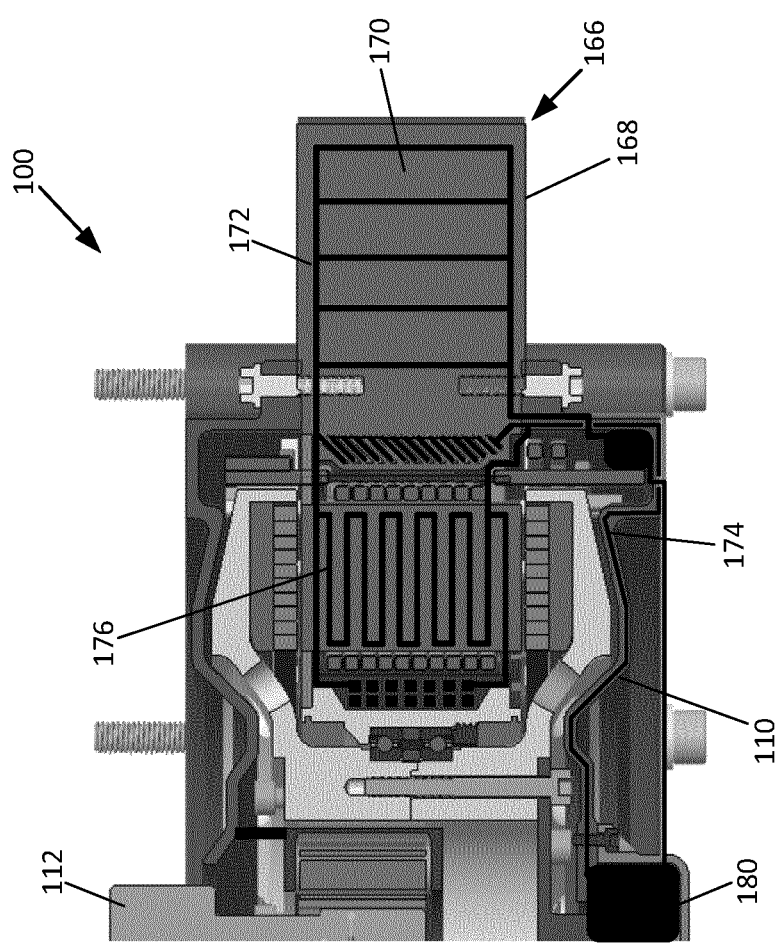
FIG. 11 is a partial view of a cross-section taken of the electric motor assembly unit where example coolant pathways are overlaid.

In accordance with certain aspects of the disclosure, the circumferential wall includes a heat exchanger 166. Referring to FIG. 11, the heat exchanger 166 includes an exchanger housing 168 and a coolant pathway 172 routed within the exchanger housing 168. In some implementations, one or more cooling plates 170 are disposed within the exchanger housing 168 and the coolant pathway 172 delivers heated coolant to the cooling plates 170. In other implementations, the coolant pathway 172 may extend through a monolithic structure (e.g., a corrugated structure) within the exchanger housing 168. In certain examples, the monolithic structure forms the exchanger housing 168. In some implementations, the heat exchanger 166 extends around a full circumference of the electric motor 110 (e.g., of the stator assembly 114). In other implementations, the heat exchanger 166 may extend over only a section of the circumference. In such implementations, a cooling jacket or other housing member may extend around the remainder of the circumference to form the motor housing 118.

In certain implementations, the coolant pathway 172 through the exchanger housing 168 is fluidly coupled to another coolant pathway 174 through the electric motor 110 leading to a coolant pump 180. In certain examples, the coolant pathway 174 extends through channels defined in the motor housing 118. In certain examples, the coolant pathways 174 extend through components contained within the motor housing 118. The coolant pump 180 cycles the coolant through the coolant pathways 172, 174. Because the heat exchanger 166 forms part of the motor housing 118, the coolant pathways 172, 174 are designed to fluidly couple together within the electric motor 110.

In certain implementations, the electric motor 110 also includes additional coolant pathways 176 leading through the stator assembly 114 and/or the rotor assembly 116 that fluidly couple to the coolant pathways 172, 174. Accordingly, the coolant pump 180 can drive coolant through the coolant pathways 174, 176 within the electric motor 110 to collect heat from the stator and rotor assemblies 114, 116 and then deliver the coolant to the coolant pathway 172 of the heat exchanger 166 without pumping the coolant outside of the electric motor assembly unit 100. Examples of suitable coolant pathways extending through at least the stator assembly 114 are shown in U.S. Provisional Application No. 62/979,966, filed Feb. 21, 2020, and titled "Electric Motor with Integrated Cooling System," [15720.0600USP1] the disclosure of which is hereby incorporated herein by reference in its entirety.

Keeping the coolant pathways 172, 174, 176 within the electric motor assembly unit 100 removes the need for external piping and fittings between the external piping and the various components. Further, removing the external piping and locating the components within an integrated unit reduces the amount of coolant needed to span the pathways. Reducing the amount of needed pipings and coolant saves cost associated with cooling the electric motor assembly unit 100. Moreover, reducing these components also reduces the weight associated with the electric motor assembly unit 100.

In certain examples, the heat exchanger 166 shares structural supports with the electric motor 110, thereby reducing the overall weight of the electric motor assembly unit 100. For example, the heat exchanger 166 may be structurally supported by the electric motor 110 (e.g., by the stator assembly 114 and/or by the circumferential wall of the motor housing 118). In certain examples, the heat exchanger 166 forms the circumferential wall of the motor housing 118, thereby reducing the number of parts in the system to be manufactured and assembled and reducing overall weight of the system.

Figure 12:
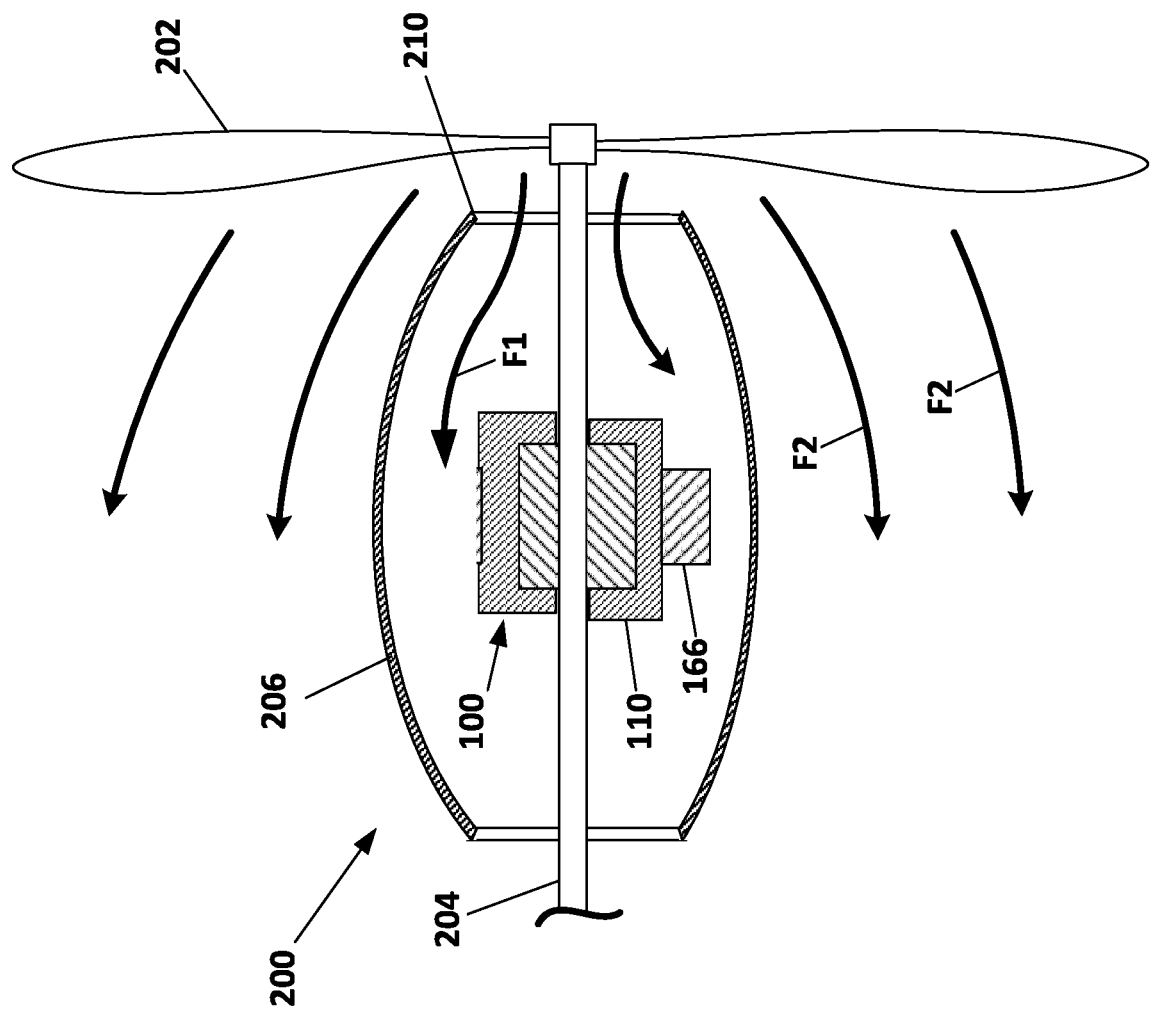
FIG. 12 is a schematic diagram of the electric motor assembly unit of FIG. 2 disposed within a nacelle of an example aircraft propulsion system and configured in accordance with the principles of the present disclosure.
Figure 13:
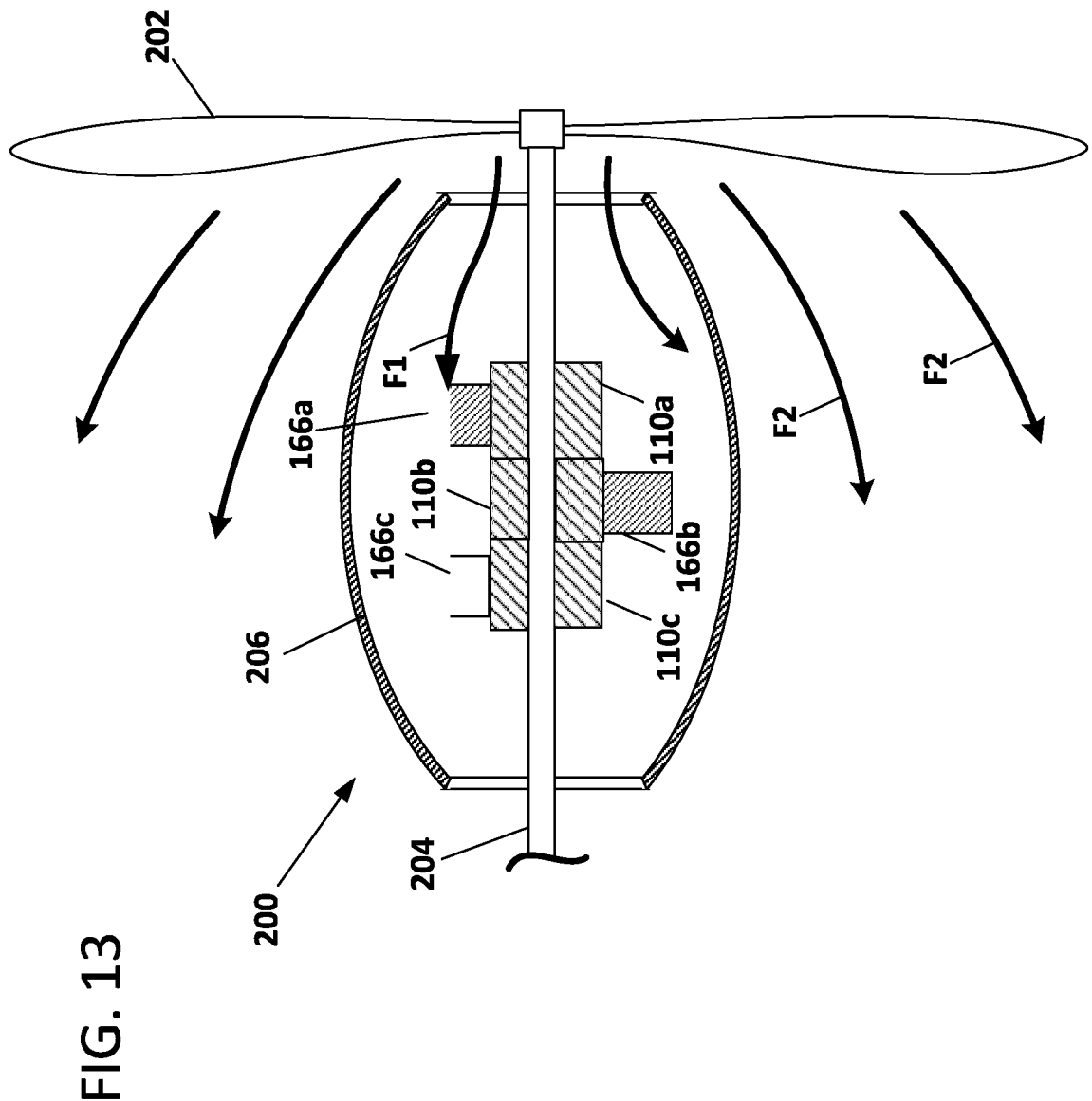
FIG. 13 shows multiple electric motors disposed within the nacelle of FIG. 12, each electric motor having a respective heat exchanger that is circumferentially staggered relative to the other heat exchangers.
Figure 14:
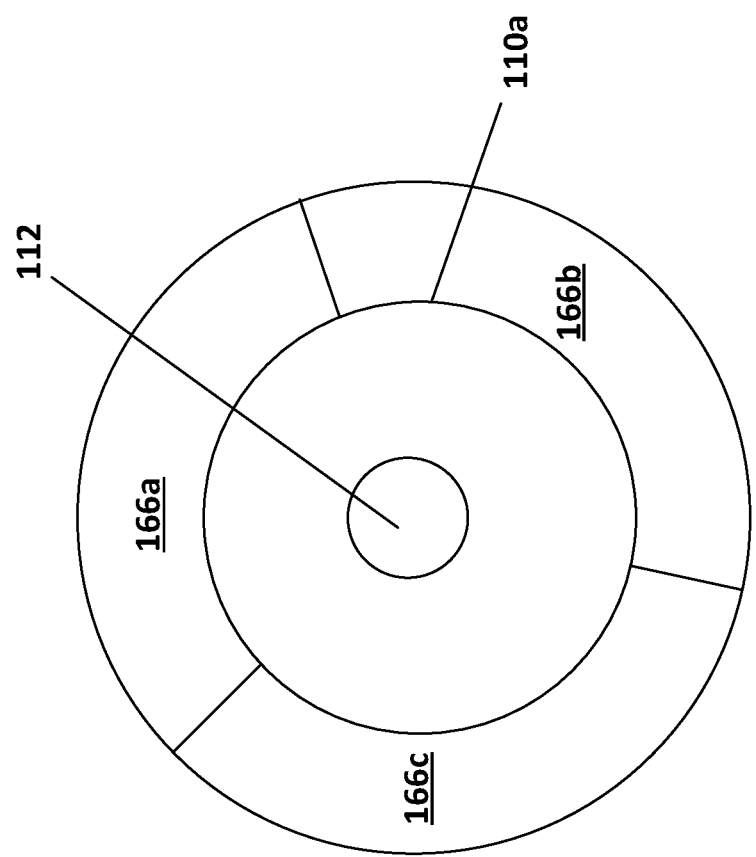
FIG. 14 is a partial view of a cross-section of the drive shaft of FIG. 13 taken along the 14-14 line.

FIGS. 12-14 illustrates one example environment (e.g., an aircraft propulsion system 200) in which the electric motor assembly unit 100 can be utilized. The propulsion system 200 includes a propeller 202 or other propulsor operationally coupled to a drive shaft 204 driven by the electric motor assembly unit 100. In certain implementations, the electric motor assembly unit 100 is disposed within an interior 208 of a nacelle 206 or other body disposed about the drive shaft 204. When the propeller 202 spins, the propeller 202 generates air flow that produces thrust for the aircraft.

In the example shown, a first portion F1 of the air flow produced by the propeller 202 enters an open end 210 of the nacelle 206 and flows towards the electric motor assembly unit 100. The electric motor assembly unit 100 is disposed within the nacelle 206 in line with the first portion F1 of the air flow. Accordingly, the first portion F1 of the air flow aids the heat exchanger 166 in dissipating heat by flowing through the heat exchanger 166 and carrying the heat away from the coolant pathway 172. A second portion F2 of the air flow produced by the propeller 202 flows around the nacelle 206. In certain examples, the first portion F1 is substantially smaller than the second portion F2.

Figure 15:
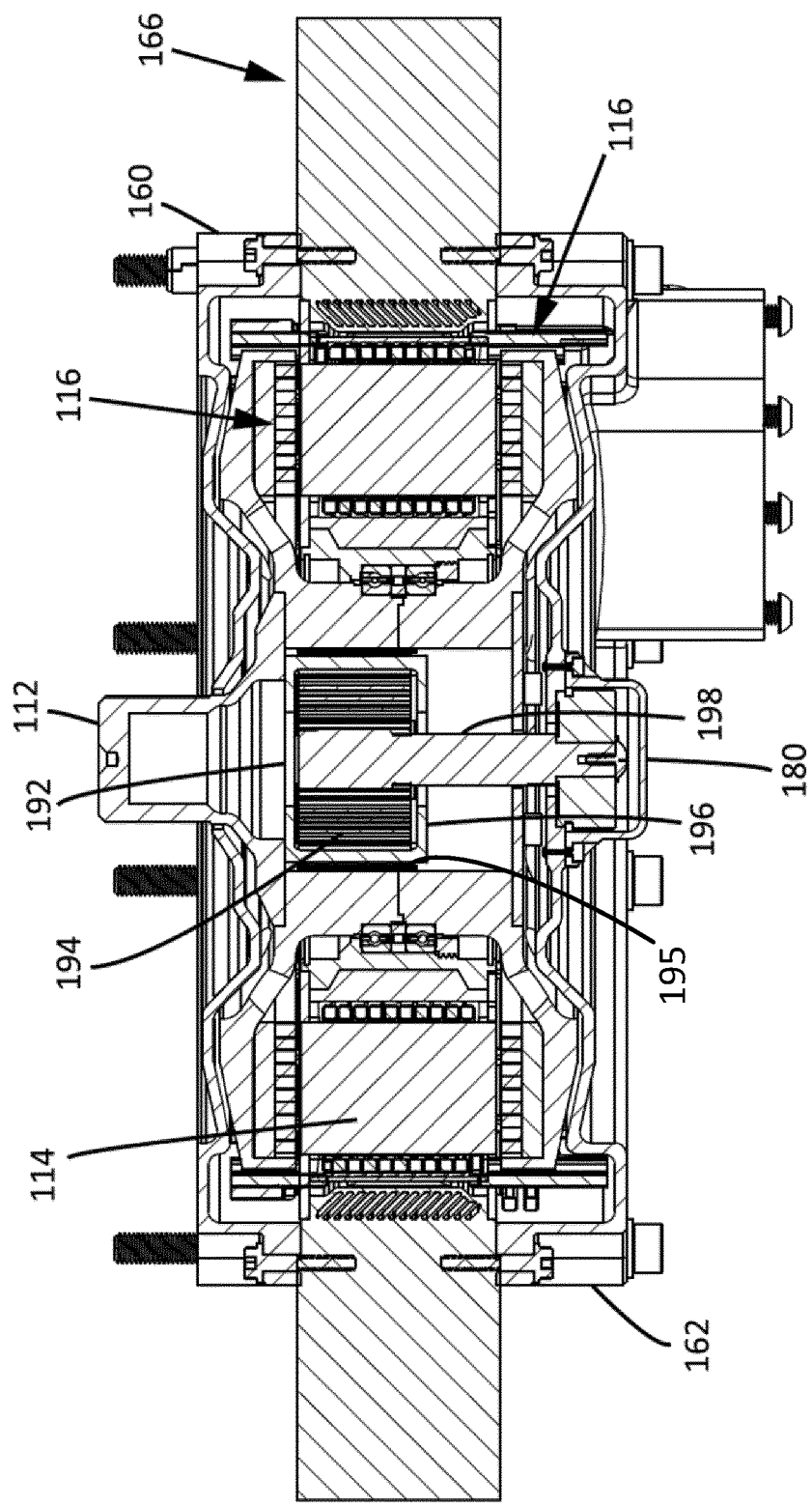
FIG. 15 is a cross-sectional view of the electrical motor assembly unit of FIG. 2 taken along the 4-4 line.
Figure 16:
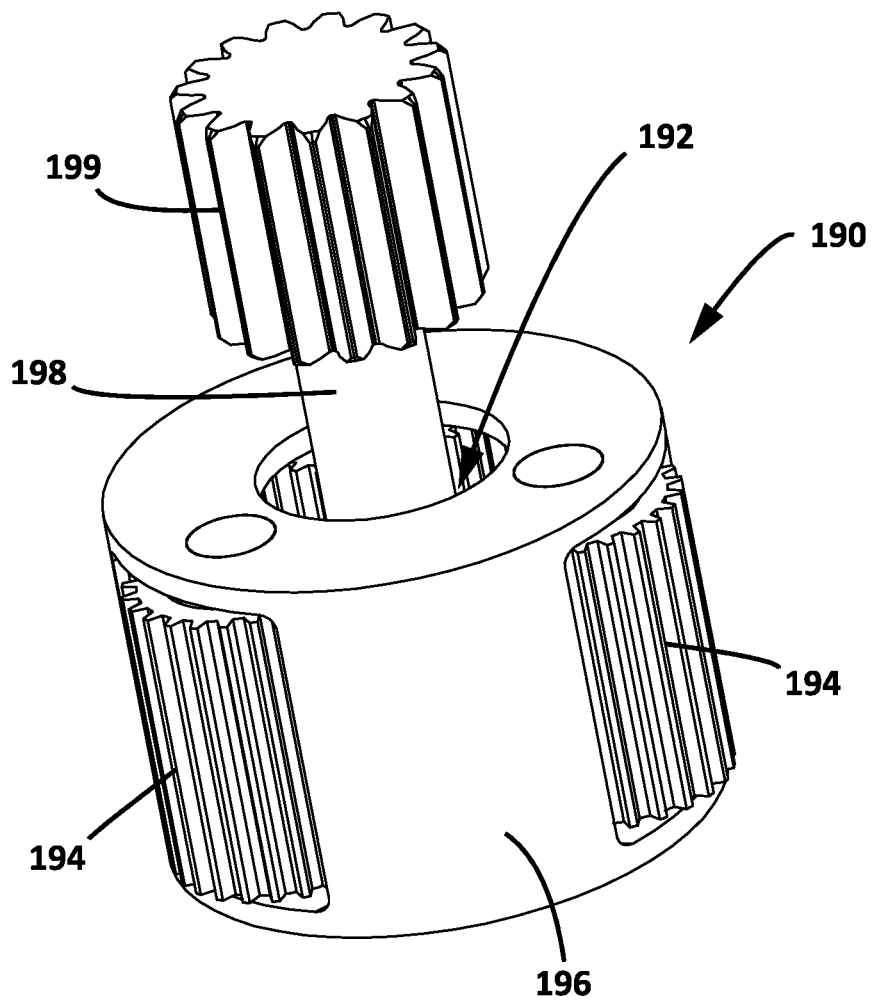
FIG. 16 is a perspective view of part of an epicyclic gear train suitable for use with the electric motor assembly unit of FIG. 2.
Figure 18:
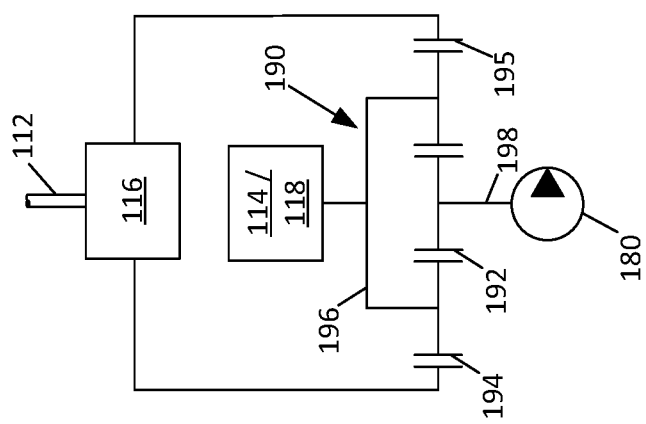
FIG. 18 is a schematic diagram of the epicyclic gear train and related components of the electric motor assembly unit of FIG. 2.

As shown in FIGS. 13 and 14, multiple electric motors 110 may cooperate to apply torque to the drive shaft 204. Each electric motor 110 may have a respective heat exchanger 166. In certain implementations, the heat exchangers 166 may be arranged to allow the first portion F1 of the air flow to reach each of the heat exchangers 166 (e.g., arranged so that none of the heat exchangers 166 blocks any of the other heat exchangers 166). As shown in FIG. 13, a first electric motor 110a is disposed in line with a second electric motor 110b and a third electric motor 110c. Each of the electric motors 110a-110c has a respective heat exchangers 166a-166c that extends along only part of a circumference of the electric motor 110a-110c. As shown in FIG. 14, the heat exchangers 166a, 166b, 166c can be circumferentially staggered so that an axial end face of each heat exchanger 166a, 166b, 166c is accessible to the first air flow F1. Referring to FIGS. 15, 16, and 18, the coolant pump 180 can be integrated into the electric motor assembly unit 100. For example, the coolant pump 180 can be mounted directly to the electric motor 100 (e.g., to the motor shaft 112). In some implementations, the coolant pump 180 can be operated by rotation of the motor shaft 112. In such implementations, the coolant pump 180 drives the coolant based on the speed at which the rotor assembly 116 is rotating relative to the stator assembly 114. In other implementations, however, the coolant pump 180 can be operationally coupled to the rotor assembly 116 via a gear train to change the torque and/or speed applied to the coolant pump 180.

In certain implementations, the coolant pump 180 can be operationally coupled to the rotor assembly 116 via an epicyclic gear train 190. The epicyclic gear train 190 includes a sun gear 192 that meshes with a plurality (e.g., three) planetary gears 194 that surround the sun gear 192. The planetary gears 194 mesh with inner teeth 195 of a surrounding ring. In the example shown, the inner teeth 195 are disposed on the interior face of a sleeve or hub area defined by the rotor assembly 116 within which the epicyclic gear train 190 is disposed. In certain implementations, the planetary gears 194 are held in position around the sun gear 192 by a gear housing 196 relative to which the planetary gears 194 rotate. The gear housing 196, which functions as a carrier for the planetary gears 194, may be rotationally fixed relative to the stator assembly 114 and/or to the motor housing 118.

In certain implementations, the epicyclic gear train 190 is disposed within the electric motor 110. For example, the epicyclic gear train 190 may be disposed inside of the rotor assembly 116. In certain examples, the central hub portion 148 of the magnetic rotors 140, 142 may include inner teeth to form the surrounding ring of the epicyclic gear train 190. Accordingly, the sun gear 192 spins at a different speed and/or with a different torque from the rotor assembly 116. If the motor shaft 112 is directly coupled to the rotor assembly 116, then the sun gear 192 spins at a different speed and/or with a different torque from the motor shaft 112.

In certain implementations, the sun gear 192 may include a shaft 198 that extends outwardly from the sun gear 192 along an axis of rotation of the sun gear 192. In an example, the axis of rotation of the sun gear 192 is the longitudinal axis L of the electric motor assembly unit 100. In certain examples, the shaft 198 couples to the coolant pump 180 (e.g., see FIG. 15). For example, the coolant pump 198 may be coupled to the sun gear 192 to optimize the rotational speed of the pump for efficiency and weight. In such examples, a motor shaft 112 that is coupled to rotate in unison with the rotor assembly 116 extends from an opposite side of the electric motor 110 from the coolant pump 180 (e.g., see FIG. 4).

Figure 19:
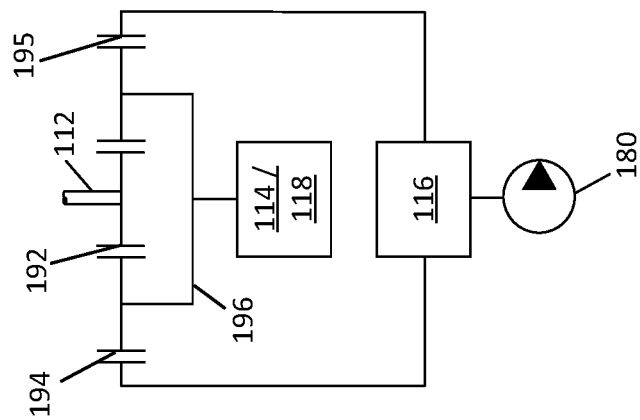
FIG. 19 is a schematic diagram of an alternative arrangement of the epicyclic gear train and related components of the electric motor assembly unit of FIG. 2.

In other implementations, the coolant pump 180 may be coupled to rotate in unison with a carrier (e.g., gear housing 196) turned by the planetary gears 194. In certain examples, the coolant pump 180 may be embedded within the motor shaft 112. In such examples, the motor shaft 112 may be defined by the shaft 198 of the sun gear 192 (e.g., see FIG. 8). In other implementations, the coolant pump 180 may be coupled to rotate in unison with the rotor assembly 116, as is shown at FIGS. 11 and 19. With such a configuration, the epicyclic gear train 190 may be used to interconnect the rotor assembly 116 with the motor shaft 112 such that the output speed/torque of the motor shaft 112 is different than the output speed/torque of the rotor assembly 116 as also shown at FIGS. 11 and 19.

Figure 17:
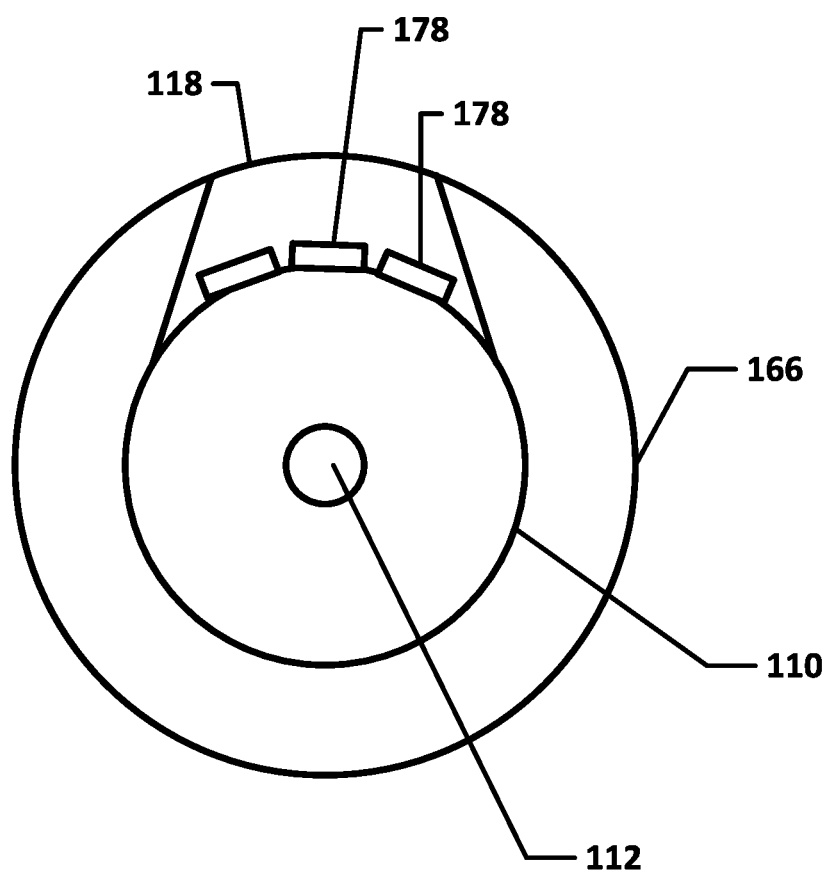
FIG. 17 is a schematic diagram of an example end view of another electric motor assembly unit configured in accordance with the principles of the present disclosure.

In certain implementations, an electric drive 178 for the electric motor 110 can be integrated with the electric motor assembly unit 100. In such implementations, the electric drive 178 may share thermal management with the electrical motor 110. In some examples, the electric drive 178 may be disposed towards an inner circumferential surface of the heat exchanger 166. Coolant routed to the heat exchanger 166 may pass by the electric drive to collect heat. In other examples, the electric drive 178 may be mounted to a cooling jacket that extends over part of a circumference of the electric motor 110 (e.g., see FIG. 17). The heat exchanger 166 may extend over a remainder of the circumference of the electric motor 110. In certain examples, the motor housing 118 may include a cover that extends over the electric drive 178 between circumferential edges of the heat exchanger 166.

Examples of how the electric drive 178 can be suitable mounted to an exterior of the electric motor 110 are shown and described in U.S. Provisional Application No. 62/946,172, filed Dec. 10, 2019, and titled "Cooling Jacket Integrated with Cold Plate," [15720.0596USP1] the disclosure of which is hereby incorporated herein by reference in its entirety.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. An electric motor assembly unit comprising:
a) an electric motor extending a first distance along a longitudinal axis between a first axial end and a second axial end, the electric motor including a stator assembly, a rotor assembly that rotates relative to the stator assembly, and a motor shaft operationally coupled to the rotor assembly, the motor shaft extending along the longitudinal axis of the electric motor beyond the first axial end; and
b) a heat exchanger mounted to the electric motor so as to be disposed between the first and second axial ends of the electric motor and structurally supported by the electric motor, the heat exchanger including an exchanger housing and a coolant pathway routed within the exchanger housing, the exchanger housing extending radially outwardly from the electric motor so that the electric motor assembly unit has a cross-dimension that is larger than the first distance, the cross-dimension extending orthogonal to the first distance.

2. The electric motor assembly of claim 1, wherein the heat exchanger encircles the stator assembly about the longitudinal axis of the electric motor.

3. The electric motor assembly of claim 1, wherein the heat exchanger extends only a portion of a circumference of the stator assembly.

4. The electric motor assembly of claim 1, wherein the coolant pathway within the heat exchanger is a first coolant pathway, and wherein the first coolant pathway is fluidly coupled to a second coolant pathway within the electric motor.

5. The electric motor assembly of claim 4, wherein the second coolant pathway includes channels extending through a cooling jacket that surrounds the rotor assembly and the stator assembly.

6. The electric motor assembly of claim 4, wherein the second coolant pathway includes channels extending through portions of stator cores of the stator assembly.

7. The electric motor assembly of claim 4, wherein the second coolant pathway extends to a coolant pump mounted to the electric motor.

8. The electric motor assembly of claim 7, wherein the coolant pump is mounted to the motor shaft.

9. The electric motor assembly of claim 7, wherein the coolant pump is at least partially recessed into a motor housing that covers the rotor assembly.

10. The electric motor assembly of claim 1, further comprising an epicyclic gear train disposed within the electric motor so that the epicyclic gear train is enclosed within the stator assembly and rotor assembly, wherein the epicyclic gear train includes a sun gear, a carrier coupled to a plurality of planet gears that mesh with the sun gear, and an outer ring having inwardly-facing teeth that mesh with the planet gears, wherein at least one of the sun gear, the carrier, and the outer ring rotates in unison with the motor shaft.

11. The electric motor assembly of claim 10, further comprising a third coolant pathway providing coolant to the epicyclic gear train, the third coolant pathway being fluidly coupled to the coolant pathway extending through the exchanger housing.

12. The electric motor assembly of claim 11, further comprising a coolant pump mounted to the electric motor, the coolant pump being coupled to a first gear stage of the epicyclic gear train that rotates at a different speed from the motor shaft.

13. The electric motor assembly of claim 12, wherein the coolant pump is mounted to the motor shaft.

14. The electric motor assembly of claim 1, further comprising an electric drive disposed at an outer surface of the stator assembly, wherein the coolant pathway is fluidly coupled to a respective coolant pathway for the electric drive.

15. An aircraft propulsion system comprising:
a) a propeller operationally coupled to a drive shaft extending along a longitudinal axis;
b) an electric motor including a rotor assembly that rotates relative to a stator assembly to rotate the drive shaft;
c) a heat exchanger mounted to the electric motor so that the heat exchanger extends radially outwardly from the electric motor, the heat exchanger extending along the longitudinal axis between opposite first and second axial ends;
d) a flow path along which air flow generated by the propeller flows to the first axial end of the heat exchanger; and
e) a nacelle surrounding a portion of the drive shaft, the nacelle being spaced from the propeller along the longitudinal axis of the drive shaft, the electric motor and the heat exchanger being located within the nacelle, wherein the flow path includes a first flow path extending into the nacelle and a second flow path extending around the nacelle, the first flow path extending to the first axial end of the heat exchanger.

16. The aircraft propulsion system of claim 15, wherein the electric motor is one of a plurality of electric motors applying torque to the drive shaft, each of the electric motors being aligned along the longitudinal axis and being operationally coupled to the drive shaft; and wherein the heat exchanger is one of a plurality of heat exchangers, each of the heat exchangers being mounted to a respective one of the electric motors.

17. The aircraft propulsion system of claim 16, wherein each of the heat exchangers extends radially outwardly from a circumferential section of the respective electric motor, wherein the heat exchangers are circumferentially staggered so that a respective first axial end of each of the heat exchangers is accessible to the flow path.

18. The aircraft propulsion system of claim 15, wherein the heat exchanger and the electric motor share a coolant pathway.

19. The aircraft propulsion system of claim 15, further comprising an epicyclic gear train disposed within the electric motor, the electric motor sharing a coolant pathway with the epicyclic gear train.

20. An aircraft propulsion system comprising:
a) a propeller operationally coupled to a drive shaft extending along a longitudinal axis;
b) an electric motor including a rotor assembly that rotates relative to a stator assembly to rotate the drive shaft, wherein the electric motor is one of a plurality of electric motors applying torque to the drive shaft, each of the electric motors being aligned along the longitudinal axis and being operationally coupled to the drive shaft;
c) a heat exchanger mounted to the electric motor so that the heat exchanger extends radially outwardly from the electric motor, the heat exchanger extending along the longitudinal axis between opposite first and second axial ends, wherein the heat exchanger is one of a plurality of heat exchangers, each of the heat exchangers being mounted to a respective one of the electric motors; and
d) a flow path along which air flow generated by the propeller flows to the first axial end of the heat exchanger.

21. The aircraft propulsion system of claim 20, wherein each of the heat exchangers extends radially outwardly from a circumferential section of the respective electric motor, wherein the heat exchangers are circumferentially staggered so that a respective first axial end of each of the heat exchangers is accessible to the flow path.

* * * * *